United States Patent

Shie et al.

[11] Patent Number: 5,347,869
[45] Date of Patent: Sep. 20, 1994

[54] STRUCTURE OF MICRO-PIRANI SENSOR

[75] Inventors: Jin-Shown Shie; Ping-Kuo Weng, both of Hsinchu, Taiwan

[73] Assignee: Opto Tech Corporation, Taiwan

[21] Appl. No.: 36,938

[22] Filed: Mar. 25, 1993

[51] Int. Cl.⁵ .............................................. G01L 21/12
[52] U.S. Cl. ........................................ 73/755; 73/708
[58] Field of Search ...................... 73/755, 708; 338/4

[56] References Cited

U.S. PATENT DOCUMENTS

| | | | |
|---|---|---|---|
| 4,317,126 | 2/1982 | Gragg, Jr. ............................ | 352/26 |
| 4,541,286 | 9/1985 | Holme .................................. | 73/755 |
| 4,682,503 | 7/1987 | Higashi et al. ...................... | 73/755 |
| 4,984,046 | 1/1991 | Graeger et al. ..................... | 357/26 |
| 4,995,264 | 2/1991 | Stocker et al. ...................... | 73/702 |
| 5,079,954 | 1/1992 | O'Neal, III ........................... | 73/755 |

OTHER PUBLICATIONS

Carlos H. Mastrangelo et al., "Microfabricated Thermal Absolute-Pressure Sensor with On-Chip Digital Front-End Processor", *IEEE Journal of Solid-State Circuits*, 26:No. 12:1998–2007, Dec. 1991.

A. W. vanHerwaarden et al., "Double-Beam Integrated Thermal Vacuum Sensor", *Journal of Vacuum Science Technology*, 5:No. 4:2454–2457, Jul./Aug. 1987.

*Primary Examiner*—Donald Woodiel
*Attorney, Agent, or Firm*—Merchant, Gould, Smith, Edell, Welter & Schmidt

[57] ABSTRACT

A new structure of a vacuum meter with good designs of temperature compensation and stabilization, The structure comprises a floating plate made by a micromachining technique and a thermal sensitive element installed on the floating plate, The floating plate has a number of suspending arms extending outward to supporting the floating plate in a cavity of a semiconductor substrate for good heat isolation. The area of the floating plate and the length and width of the suspending arm has a specific ratio for an optimized sensitivity. A dummy resistor for temperature compensation is composed by a serial connection of a constant resistor with almost zero temperature coefficient and the thermal sensitive elements in a specific ratio. The vacuum meter further overlap on a temperature-controlled thermoelectric cooling device and is covered by a thermal shield so that the temperatures on and circumferential to the floating plate can be maintained stably.

7 Claims, 21 Drawing Sheets

STRUCTURE OF MICRO-PIRANI SENSOR

BACKGROUND OF THE INVENTION

The present invention relates to a micro-Pirani thermal conductive vacuum sensing device with a new structure and to a circuitry design for temperature compensations, and more particularly, to a method for manufacturing such a vacuum meter.

The vacuum industry has been developed for a very long time. In scientific studies and industrial utilizations, the vacuum equipments are used widely. One essential device of the vacuum equipments is a meter for sensing the vacuum degrees. There are many vacuum meters in the market. The following table represents various pressure regime (in torr) of the well-known sensing meters. The pressure region most commonly used at the present is from $10^{-6}$–$10^{-5}$ torr to an atmospheric pressure. In general, the metering region of a single vacuum meter cannot cover the above pressure region. To obtain such a pressure region, it should use alternatively two vacuum meters.

TABLE 1

Pressure Regions of Various Vaccum Meters $10^{-13}$ $10^{-12}$ $10^{-11}$ $10^{-10}$ $10^{-9}$ $10^{-8}$ $10^{-7}$ $10^{-6}$ $10^{-5}$ $10^{-4}$ $10^{-3}$ $10^{-2}$ $10^{-1}$ $10^{-0}$ $10^{1}$ $10^{2}$ $10^{3}$

- diaphram guage
- Pirani gauge
- Penning gauge
- ion gauge
- guadrapole mass spectrometer At present, the commonly-used vacuum meters are vacuum meters of thermal conductivity type. The well-known thermal-conductive vacuum meters mainly comprise two kinds: Pirani vacuum meters and thermocouple vacuum meters. The conventional Pirani vacuum meters are designed according to the relationship of heat loss of a filament heated in vacuum and the vacuum pressure within a suitable-used region of the meter, i.e., the relationship when the mean-free path of molecules in a certain vacuum pressure is corresponding to the inner size of a cavity in which the heated article is installed. FIG. 16a and 16b show the heat-dissipation diagram and curves of a heated article (i.e. a heated filament 19 in this drawing) in vacuum, respectively. As shown in FIG. 16a, the heat loss of the filament 19 can be dissipated from (1) the solid leads of the filament (solid conduction, as indicated in the arrow 1); (2) the surface of the filament (radiation, as indicated in the arrow 2) and (3) in the form of vapor molecules (gase conduction, as indicated in the arrow 3). If the heat loss of the heated article dissipated in the form of vapor molecules is irrelevant to the vacuum pressure or is very small in comparison with the heat loss dissipated in the other two manners, the vacuum pressure can not be measured. In the heat-transfer of the vapor molecules, when the molecules strike the filament 19, a part of thermal energies of the filament 19 will be transferred to kinetic energies of the molecules and be taken away by the molecules. When the molecules with kinetic energies strike the wall of the cavity with a lower temperature, a partial kinetic energy of the molecules will be transferred outwardly via the wall of the cavity. More the number of the molecules striking the wall are, more the transferred heat is. Further, in a constant bias condition, the temperature changed accordingly of the filament is inversely proportional to the number of striking molecules. The change of the temperature results in the change of the resistance of the filament. Therefore, it can use a bridge circuit to measure the variation of the resistance of the filament and to calculate the density of molecules and then the vacuum pressure is measured therefrom.

The above thermal conductive vacuum meter, however, is effective only within certain pressure regions, which is relative with the construction of the filament and the cavity and the leads of the filament. FIG. 16b shows respective heat-transferring curves of the solid leads, the surface of the filament and the vapor molecules (A), (B) and (C). As shown in Curve (C), in the case of a high vacuum pressure, though the number of molecules striking the filament increases proportionally to the increase of the pressure, the mean-free path of molecules will be decrease inversely so that the heat loss can not be effectively transmitted outside of the wall of the cavity. It means that when the vacuum pressure exceeds a limited value, the variation of pressure will no longer influence the rate of gas transmission and at this time, the vacuum meter reaches its maximum limitation of measurement, which is determined by the ratio of the mean-free path of molecules and the distance between the meter and the wall of cavity. Further, in the case of an extremely low pressure (i.e., high vacuum degrees), the number of molecules will be largely decreased to result that the gas heat-transfer is smaller than the heat transfer from the leads and the surface of the filament. Therefore, the variation of temperature of the gas will be too small to be metered by the vacuum meter. At the time, the vacuum meter reaches its minimum metering limitation.

Similarly, the Pirani vacuum meter mentioned above measures the vacuum pressure according to the changes of temperature and thus the resistance of the filament resulted from the change of gas pressure. In general, the variation of resistance of the filament can be measured by a bridge circuit as shown in FIG. 17. In the utilization of the bridge circuit of FIG. 17 to measure the vacuum pressure, the bridge circuit should be zero-point calibrated in a first step by the following steps:

(1) Positioning the vacuum meter in a very low vacuum pressure (i.e., a very high-degree vacuum) which is extremely low in comparison with the minimum limitation of the meter, so that the very low vacuum pressure is called as a pseudo-absolute vacuum. At this time, it deems that the heat loss of the filament only resulting from the solid leads and the surface radiation of the filament;

(2) Adjusting a voltage meter $R_2'$ of the bridge circuit to make the output of the bridge circuit to be nulled, i.e., the output of the bridge circuit is balanced. It means that an electrical response signal generated from heat exchanges of the solid heat-transfer and the surface radiative heat-transfer is deleted. The adjustment step is handled in a constant temperature (i.e., a reference temperature mentioned hereinafter); and (3) Filling the vacuum system with gas to a linear pressure region of the meter and then measure the output of the bridge circuit by the Pirani vacuum meter and a standard vacuum meter, respectively. Then calculate the sensitivity of the vacuum meter by means of at least the two measured values and store the calculated result into a memory for later uses.

The conventional Pirani vacuum meter, however, has a problem that the temperature and resistance of the filament will change with the ambient temperature so that an ambient temperature drift effect occurs. The ambient temperature drift effect will change the measured signal of the meter. To avoid such a problem, one conventional approach, as shown in FIG. 17, is to set a dummy tube S' which is similar to a real sensing tube G' in structure on one arm of the bridge-circuit for compensation. The real sensing tube G' is set on the other arm of the bridge circuit which is also shown in FIG. 17. The dummy tube S' is a sealed tube in a pseudo-absolute vacuum and thus will not be influenced by the vacuum pressure. Further, the temperature of an filament of the dummy tube S' is set to be the same as that of the sensing tube G'. Besides, the dummy tube and the sensing tube are very close each other so that the ambient temperatures thereof are very similar. Accordingly, the change of the ambient temperature will influence simultaneously the two tube but not the output of the bridge circuit. In reality, however, the construction and the spatial configuration of the two tubes would not be identical each other and the compensation of temperature could not be sufficiently perfect. Such method therefore can not thoroughly solve the problem of the ambient-temperature-drift effect. That is, the drifting noise generated by the ambient temperature will still influence the accuracy and the minimum limitation of the vacuum pressure measured by the vacuum meter.

The operation methods of the Pirani vacuum meter include: (1) a constant-bias method: the vacuum pressure is measured according to the voltage difference of the bridge circuit; since the resistances of most of metals will increase with the increase of the temperature and the temperature of filament will change proportionally to the vacuum pressure, the vacuum pressure can be measured by means of detecting the resistance of the filament (i.e., the voltage difference of the output of the bridge circuit); and (2) a constant-temperature or constant-resistance method: this method is to maintain the temperature of the filament by adjusting the bias-voltage of the bridge circuit (i.e., the resistance of the filament is constant and the bridge circuit is always kept balanced) and then to measure the vacuum pressure according to the applied power or the voltage drop on the filament. At present, most of the Pirani vacuum meters adopt the second operation method since the second method has a better sensitivity. In general, the filament is made of metals with higher temperature coefficient of resistance (TCR). Conventionally, the materials include Wu, Ni or other metal alloys.

The conventional thermal conductive-type vacuum meters, however, have large volumes and it is hard to make the respective temperatures of the vacuum meter and the dummy tube match well each other. The linear range of pressure of the vacuum meter therefore is only between 1 to $10^{-3}$–$10^4$ torr and is difficult to be lower. In addition to the above disadvantage, such vacuum meters are only manufactured in a single-unit production but not in a batch production which makes the cost of the meter expensive.

Recently, it is widely considered to utilize the semiconductor micromechining technology to manufacture various micro-sensors. Such method can fabricate the sensors in batch production and the volume of each of the sensors thus fabricated is very small. The technology also provide the advantage of manufacturing a signal-processing IC with the micro-sensor for versatile sensing. One of such micro-sensors is as shown in FIG. 18 taught by Mastorangele. The device comprises a polysilicon layer 181 which is made by the semiconductor technique and is floating on a substrate and a plurality of longitudinal slim beam 182 (only one is shown in the figure) made by an anisotropic etching method in replace of the conventional filament. The longitual slim beam 182 is used to make the vacuum meter having a high thermal resistance, but as the conventional filament, the surface area of the beam 182 is too small to provide sufficient striking chances of molecules for sensitivity. Thus, the vacuum meter is hardly used for measuring the pressure lower than $10^{-3}$–$10^4$ torr.

To add the sensing area, it has been disclosed a thermopile vacuum meter of which the floating plate has a larger surface area in comparison with that of the meter shown in FIG. 18. As shown in FIG. 19, the vacuum-meter comprises a floating glass plate 191 having one end connected to a semiconductor substrate 192 and the other end floating in a cavity of the substrate 192. A plurality of serial thermopile sensing elements 193 and heating elements 194 are installed on the surface of the floating glass plate 191. Although the meter has larger surface area, the cross area of the floating plate 191 contacting with the substrate 192 is large which results in a worse heat isolation. Further, the temperature of the floating plate in proximity to the end connected with the substrate 192 will rise slower than other positions so as to decrease the effective average temperature of the meter and thus the pressure sensitivity thereof is worse.

SUMMARY OF THE INVENTION

One object of the present invention is to provide a new structure of a micro-Pirani vacuum meter which comprises a floating glass thin plate made by silicone semiconductor techniques and a thermal sensitive element installed on the floating plate. Further, from the edges of the floating thin plate, there are a number of arms extending to connect with an etched cavity of a substrate for good isolation of heat from the substrate. In the present invention, to get an optimized sensitivity, the area of the floating thin plate and the length and width of the arms should have specific ratios.

The other object of the present invention is to provide methods for manufacturing a micro-Pirani vacuum meter with the above structure. The present invention utilizes semiconductor techniques to manufacture the vacuum meter and dummy resistor for temperature compensation simultaneously so that the problem of the ambient temperature drift effect mentioned above can be solved.

A further object of the present invention is to provide a micro-Pirani vacuum meter which is stacked on a solid-state thermoelectric cooler and to provide a thermal shield to cover the whole structure of the sensor device to enhance the temperature compensation and stabilization and further increase the measuring domain of pressure.

These and other objects, advantages and features of the present invention will be fully understood and appreciated by reference to the written specification.

DETAILED DESCRIPTION OF THE INVENTION

Figure 1:
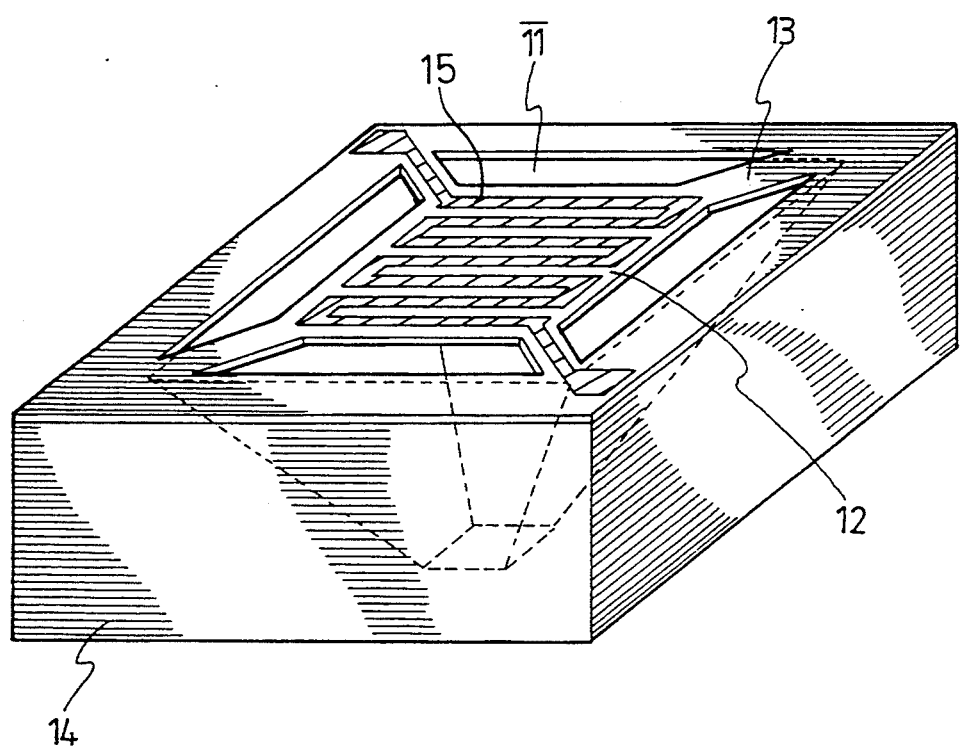
FIG. 1 shows a structure of a sensing device manufactured by a method of the present invention; said device has a good isolation effect.

In accordance with the present invention, the construction of the micro-Pirani vacuum meter (called a sensing device hereinafter) is as shown in FIG. 1. The micro-Pirani vacuum meter comprises a silicon substrate 14 in which a rectangular cavity 11 is formed by an etching technique and a glass thin floating plate 12 is set above the rectangular cavity. The floating plate 12 includes a number of slim supporting arms 13 extending from the edges thereof to connect with the silicon substrate 14 to support the floating plate 12 to be suspended in the cavity 11. Due to the above construction, the vacuum meter will have a better heat isolation and a very large effective pressure-sensing area (i.e., the fill factor, which is a ratio of the surface areas of the floating plate 12 and the cavity 11).

Figure 2:
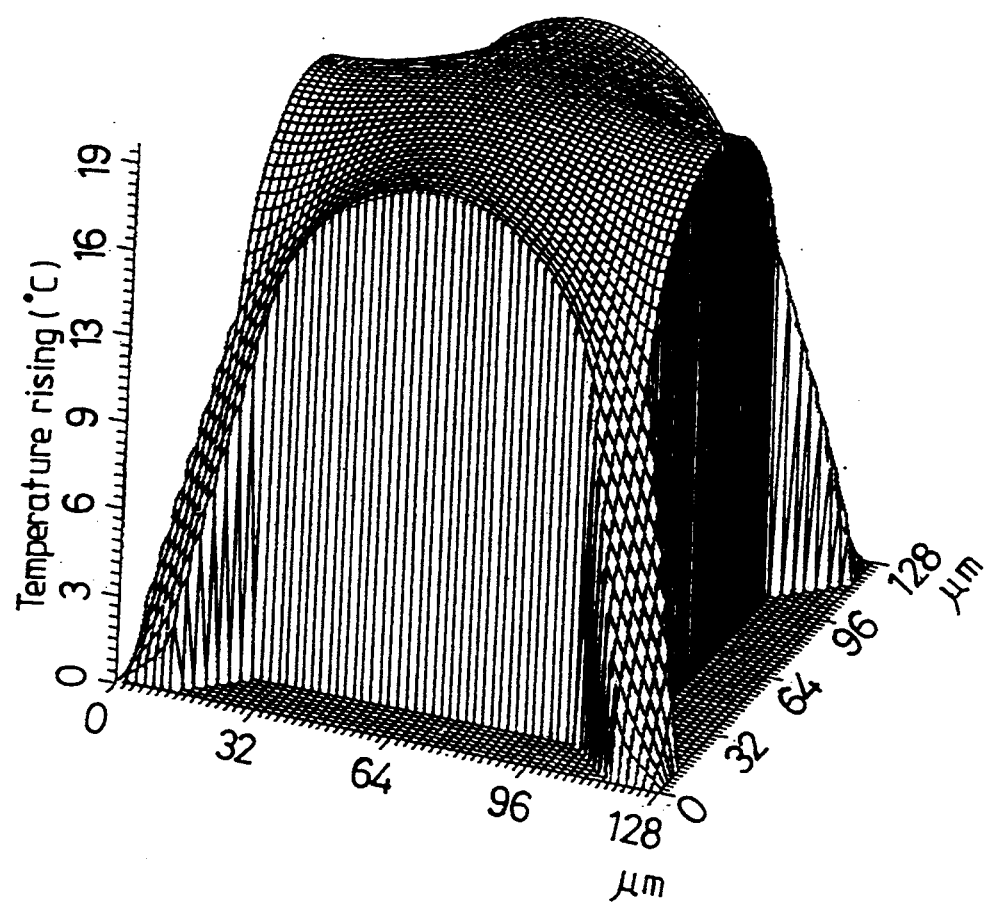
FIG. 2 shows a temperature distribution diagram of the sensing device in FIG. 1 by heating, wherein each of the support arms of the sensing device has, for example, a length A=10 μm, a width B=16 μm and the cavity that the device is installed above has a width C=128 μm.
Figure 3:
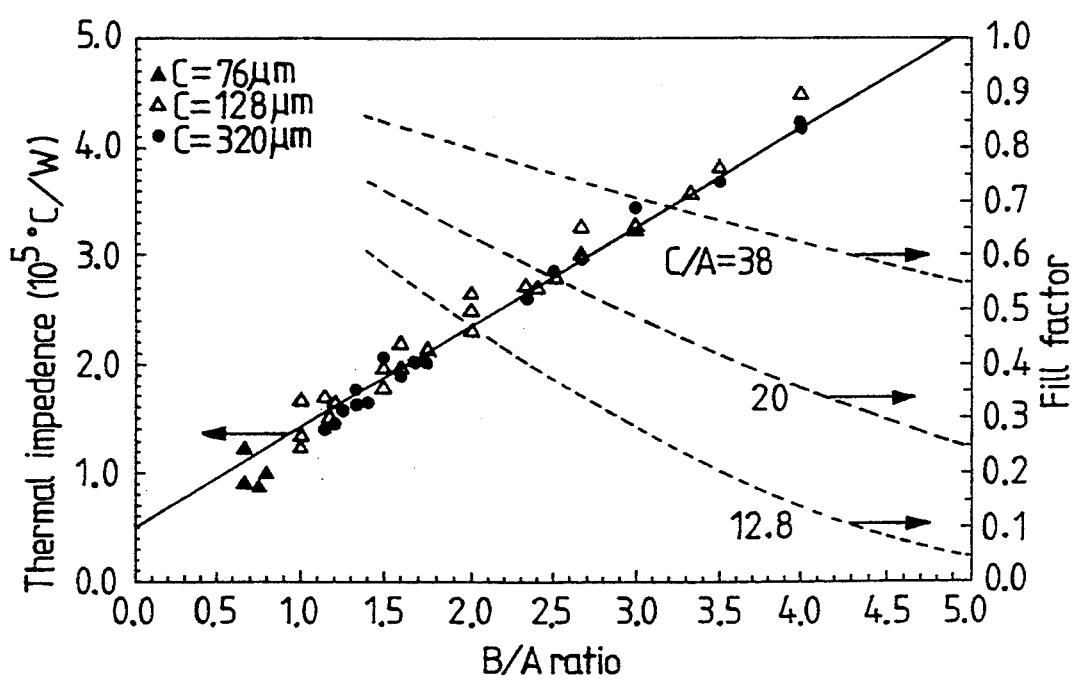
FIG. 3 is a characteristic diagram showing the relationships of the thermal impedance and the active area of the sensing device and the constructional references A, B and C.

Besides, the temperature on the floating plate 12 is uniform which forms a temperature plateau, as shown in FIG. 2. The temperature plateau is formed for the reason that the total heat impedance of the floating plate 12 is controlled by the heat impedance of the slim supporting arms 13 so that the gradient of the temperature will occur only in the supporting arms 13. Accordingly, in comparison with the conventional micro-type vacuum meters, the vacuum meter of the present invention has a better temperature sensitivity due to a larger sensing area and a good heat isolation. In addition, as the sensing area and the constructional references of the supporting arm (i.e., the arm length and width) are adjustable, the sensing device of the present invention can be designed in optimization. As shown in FIG. 3, at a constant arm width B, the total heat impedance of the sensing device is proportional to the arm length A. However, the increase of the arm length A will result in the decrease of the effective sensing area of the sensing device (i.e., the increase of the fill factor). Therefore, at a constant width of the cavity 11, it can obtain an optimized ratio of the constructional references and an optimized vacuum sensitivity and the minimum sensing limitation of vacuum pressure.

Figure 4:
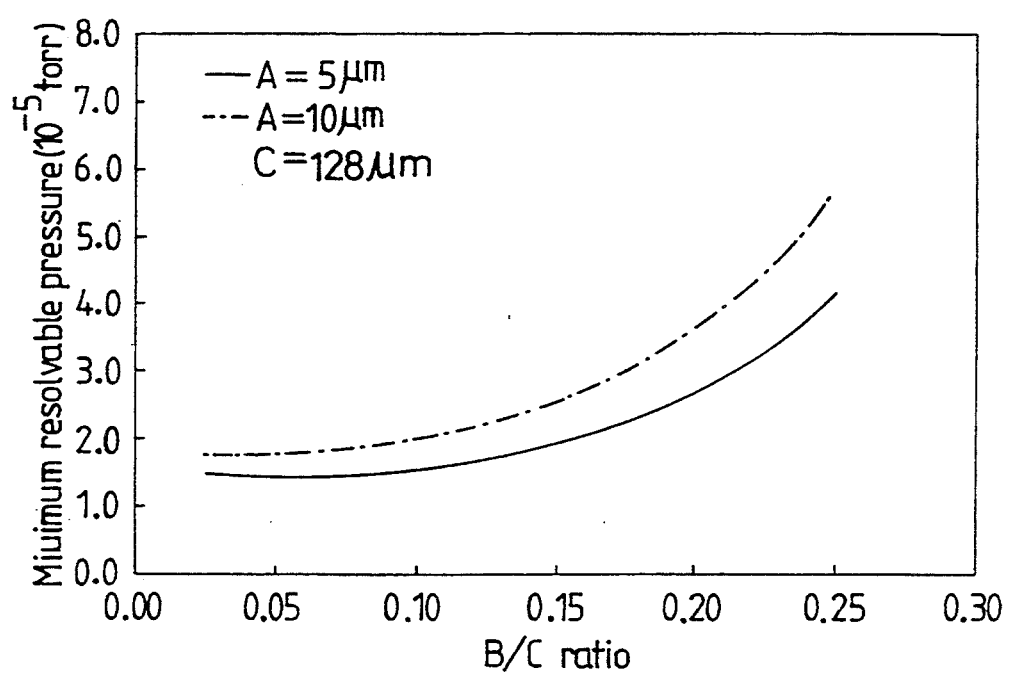
FIG. 4 is a diagram showing the relationship of the minimum resolvable pressure and the constructional references A, B and C.
Figure 5:
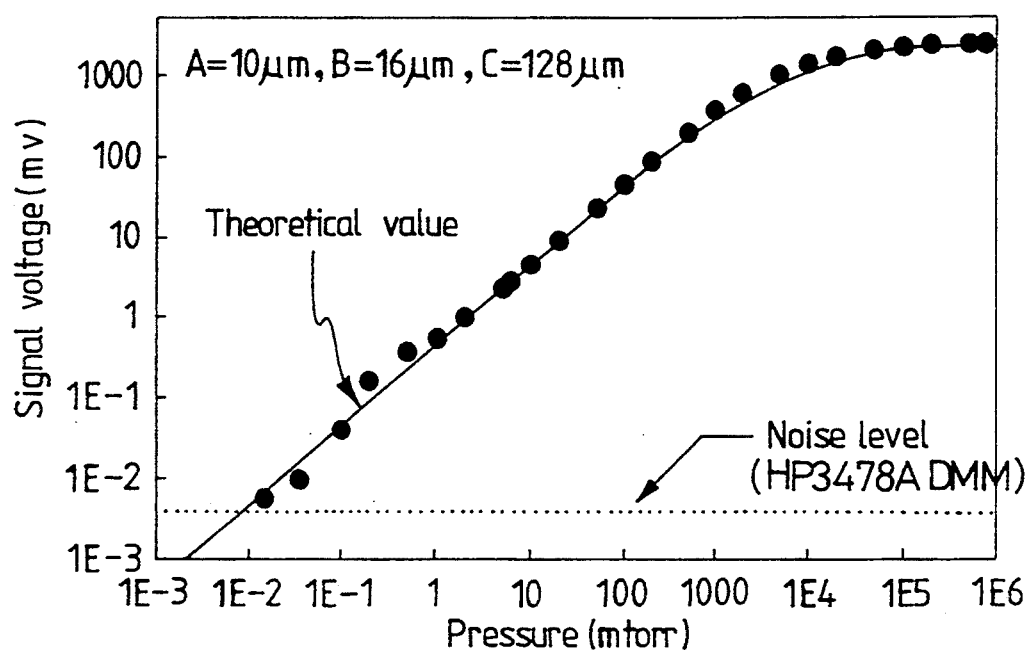
FIG. 5 is a measuring diagram of the pressure in a constant-temperature operation, wherein the black points represent the measured values by the sensing device of the present invention and the solid line represents theoretical values.

FIG. 4 shows curves of the minimum resolvable pressure and the B/C ratio which is obtained by means of theoretical calculations. At A (arm length)=5 μm, C (the width of the cavity)=128 μm, B/C=0.06 and the system noise=4 μV (a DMM meter with a model type HP3478A), the meter can measure a minimum pressure approximately to $10^{-5}$ torr, which is more effective than the conventional vacuum meter. FIG. 5 shows a practical measuring curve of pressure in a constant temperature, wherein the black points represent the measured values and the solid line represents the theoretical curve. From the figure, it can be seen that the accuracy of measurement starts bad when the vacuum pressure is near $5 * 10^{-5}$ torr since the meter is influenced by the system noise at this time. While the problem can be overcome by using a measuring circuit with lower noises.

Figure 6A:
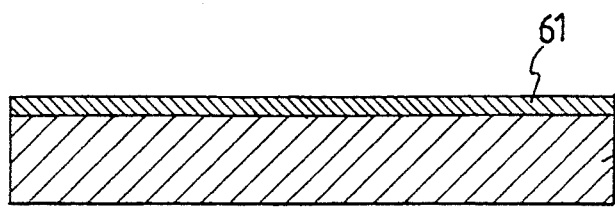
FIG. 6(a)–6(g) show manufacturing process diagrams of the sensing device of one embodiment of the present invention, wherein said sensing device is manufactured by an anisotropic V-shaped etching method.
Figure 6B:
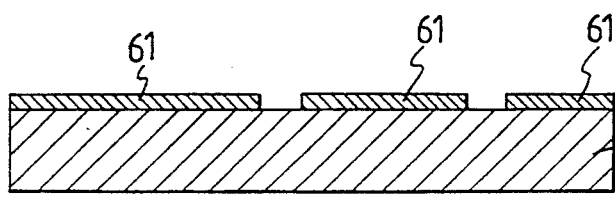
Figure 6C:
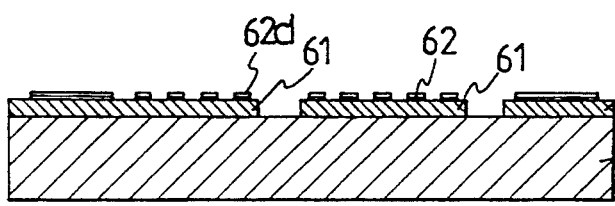
Figure 6D:
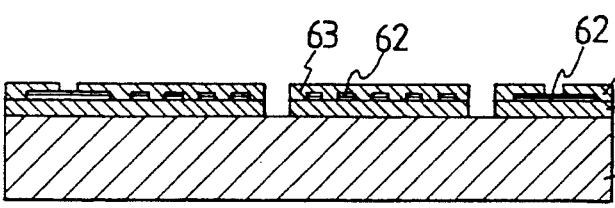
Figure 6E:
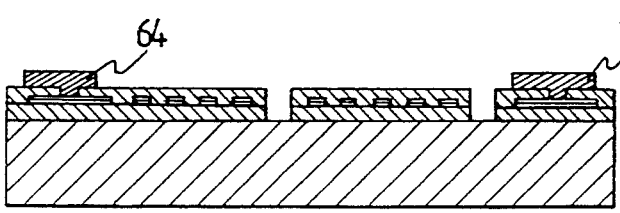
Figure 6F:
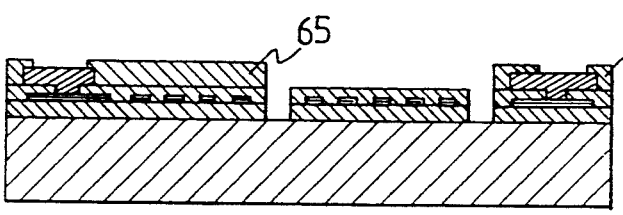
Figure 6G:
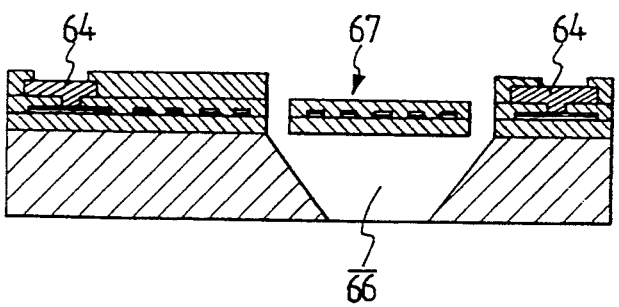

The present invention further concerns the manufacturing method of the micro-Pirani vacuum meter above. FIGS. 6(a)-6(g) show the manufacturing process of the sensing device of a first embodiment of the present invention, which comprises the steps of:

(1) growing a first thin oxide layer 61 (SiO₂ or nitride layer) on a substrate 60 (as shown in FIG. 6(a)), defining etching windows and then etching the SiO₂ layer on the etching windows with a first photolithography to form a construction shown in FIG. 6 (b);

(2) depositing a Pt thin film 62 in vacuum and manufacturing an arched temperature sensitive resistor 15 (as shown in FIG. 1) via a second photolithographic step; a dummy resistor 62d used for providing temperature compensation being manufactured in the same step; the construction at this time is shown in FIG. 6(c);

(3) depositing a second thin oxide layer 63 on the construction of FIG. 6(c) and then defining contact windows with a third photolithographic step; etching the second oxide layer on the regions of contact windows and etching windows; the etched construction is as shown in FIG. 6(d);

(4) processing a metallization step, for example, depositing Al metals 64 and then by means of a fourth photolithography, processing metal interconnections (as shown in FIG. 6(e));

(5) manufacturing a LTO passivation layer 65 and openings and obtaining a construction as shown in FIG. 6(f); and (6) etching the silicon material in the region of a cavity 66 with an anisotropic V-groove etching technique and then forming a construction of a floating plate 67, as shown in FIG. 6(g).

Figure 7A:
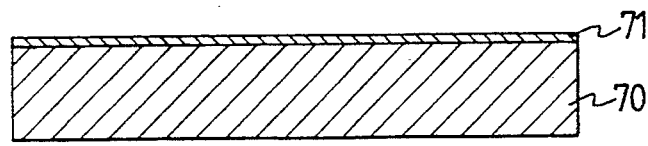
FIG. 7(a)–7(g) show manufacturing process diagrams of the sensing device of a second embodiment of the present invention, wherein said sensing device is manufactured by a sacrifice layer technique.
Figure 7B:
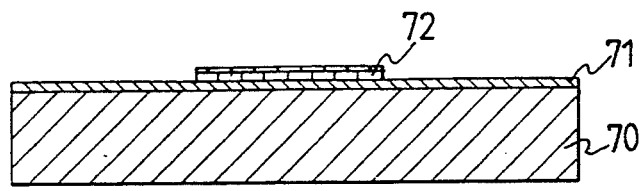
Figure 7C:
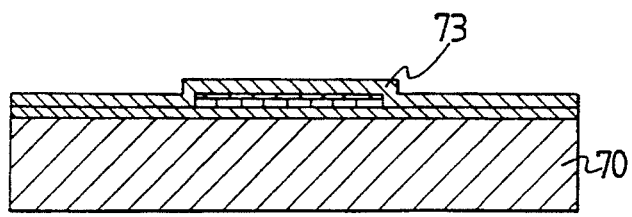
Figure 7D:
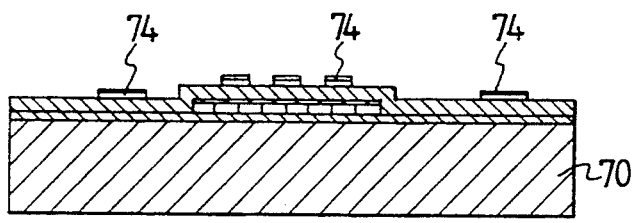
Figure 7E:
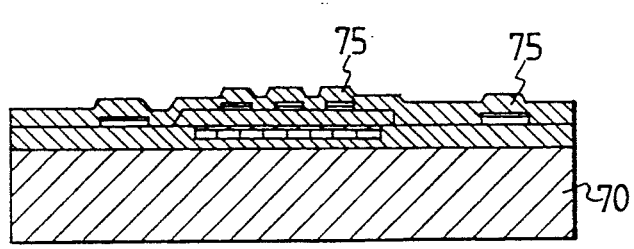
Figure 7F:
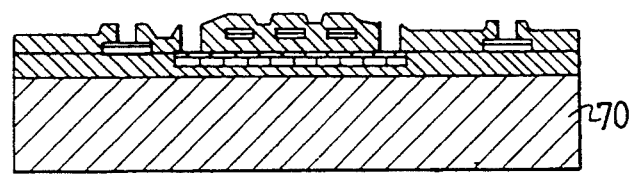
Figure 7G:
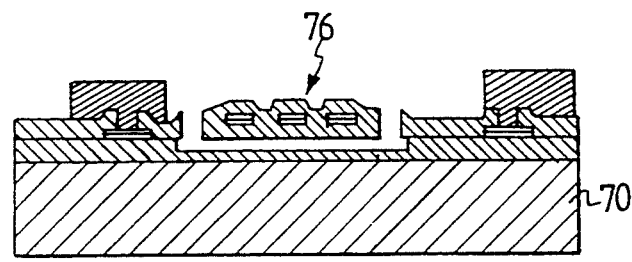

The second embodiment of the present invention utilizes a sacrifice layer method of surface micro-processing technique to manufacture the construction of a floating plate. The process is as shown in FIGS. 7(a)-7(g) and comprises the following steps:

(1) growing a first SiO₂ layer 71 by a wet oxidation manner on a silicon substrate 70 (see FIG. 7(a)) and then growing a polysilicon layer 72 about the thickness defined for the sacrifice layer (see FIG. 7(b));

(2) defining the region of the floating plate and then growing a second SiO₂ layer about 1 μm on the region (see FIG. 7(c));

(3) processing the same steps (2)-(5) of the first embodiment of the present invention mentioned above, that is, depositing a sensing resistor (thermal sensitive resistor) 74 (see FIG. 7(d)) and a third SiO₂ layer 75, etching contact windows (see FIG. 7(e)), etching openings (see FIG. 7(f)) and processing metal interconnections (see FIG. 7 (g)); and (4) etching the polysilicon sacrifice layer 72 grown in step (1) by a hydrozine etching process to form a construction of the floating plate 76, as shown in FIG. 7(g).

The third embodiment of the present invention utilizes a etch-stop method of a micro-processing technique to manufacture the construction of a floating plate. The embodiment uses a N-type silicon wafer with doped concentration lower than $10^{16}/cm^3$ as a substrate (the element referenced by 80 in FIG. 8(a)) and on the region desired to form the floating plate, implant P-type doped ions with a concentration higher than that of the substrate (as the portions referenced by 81 in FIG. 8(a)). The portions 81 with a high-doped concentration is etched finally by means of an etching solution (HF: HNO3: CH3COOH=10:30:80) to form the construction of a floating plate. The detailed process are described hereinafter by accompanying with FIGS. 8(a) to 8(h).

Figure 8A:
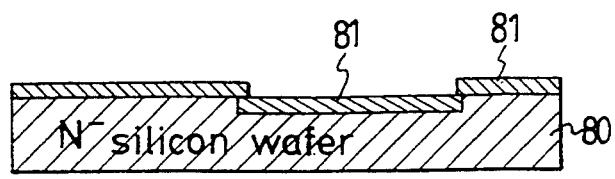
FIG. 8(a)–8(h) show manufacturing process diagrams of the sensing device of a third embodiment of the present invention, wherein said sensing device is manufactured by a low-N-concentration etching stop technique.
Figure 8B:
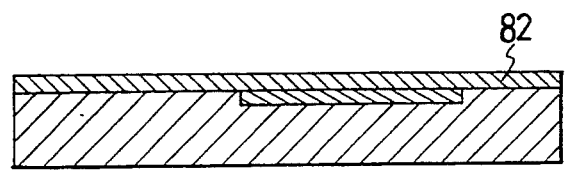
Figure 8C:
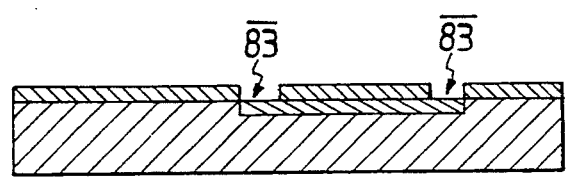
Figure 8D:
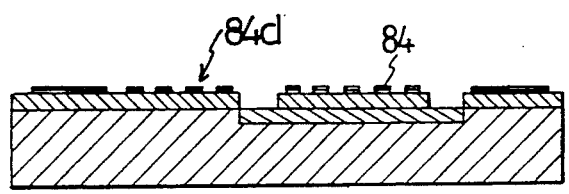
Figure 8E:
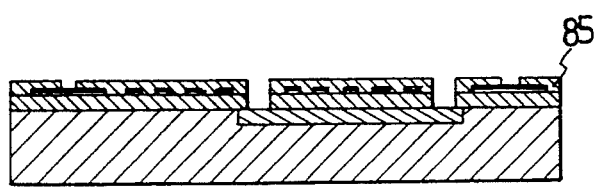
Figure 8F:
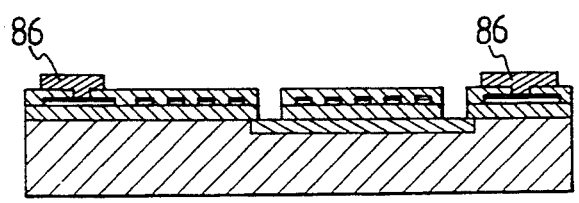
Figure 8G:
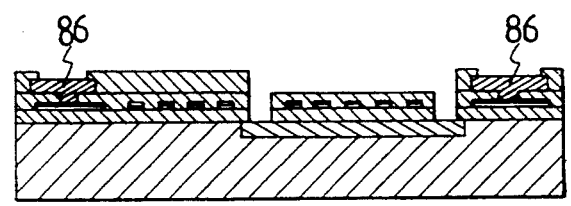
Figure 8H:
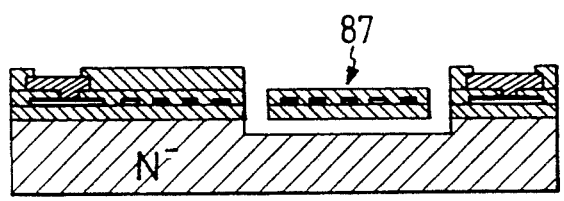

(1) On the region desired to form the floating plate, manufacture a portion 81 having a higher implantation concentration by means of a diffusion or an ion implantation method, as shown in FIG. 8(a);

(2) Deposit an oxidation layer 82 on the construction of FIG. 8(a) (see FIG. 8(b));

(3) Etch the contact window openings, as the portions referenced by 83 of FIG. 8(c);

(4) Manufacture a sensing resistors 84 by means of any known deposition method. The dummy resistor 84d is manufactured simultaneously (see FIG. 8(d));

(5) Process the deposition of an oxide layer 85 and the etching of the openings of the conductive wires, as shown in FIG. 8(e);

(6) Process a metallization step. The portions referenced by 86 in FIG. 8(f) is metals;

(7) Process a low temperature oxidation and a bonding pad opening steps, as shown in FIG. 8(g); and (8) Etch the region 81. The etching step is stopped on the substrate 80. Then, it forms the construction of a floating plate 87 as shown in FIG. 8(h).

It should be noted that in the operation of the Pirani vacuum meter, the temperature of filament will drift with the change of ambient temperature. Such drift results that the filament resistance departs from the original corrected reference value so that the output signals of the meter will have error. This problem will degenerate the measurable minimum limitation of pressure. Therefore, the present invention should comprises a temperature compensation means.

Figure 17:
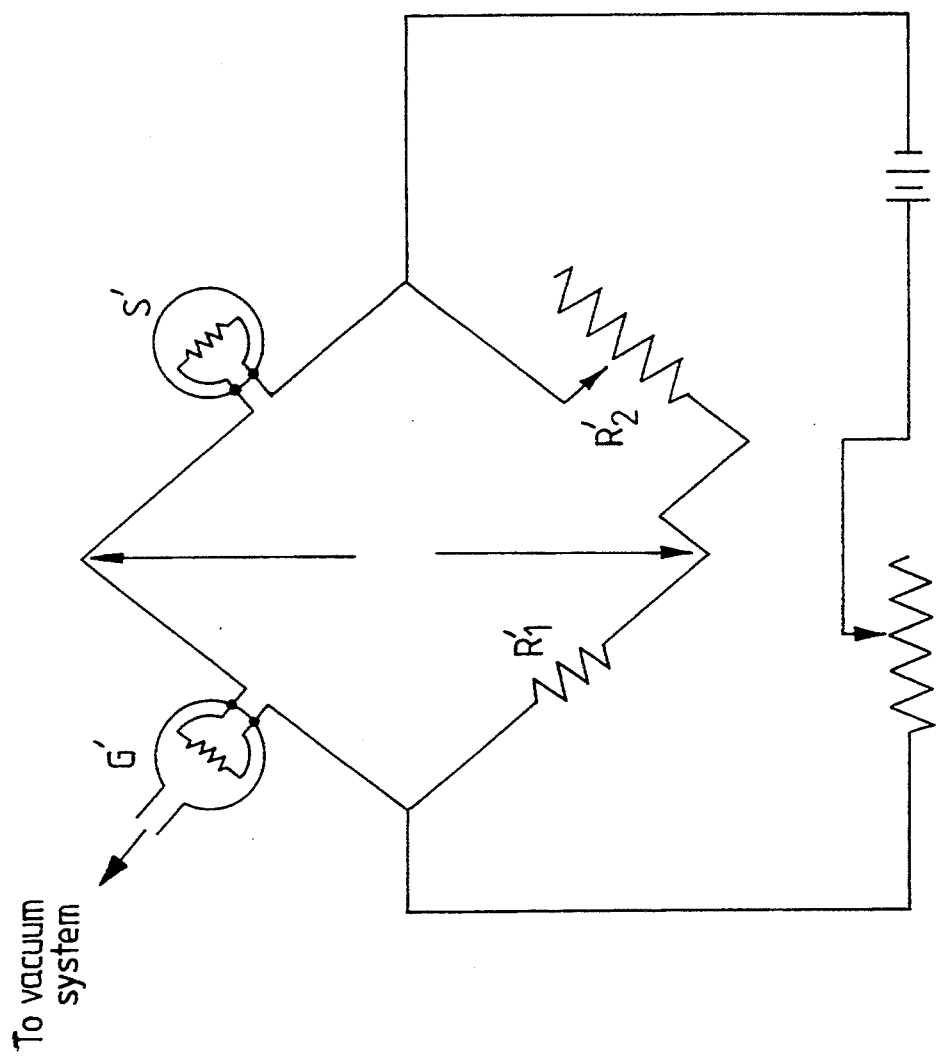
FIG. 17 shows a circuitry diagram of a conventional Pirani thermal conductive vacuum meter.
Figure 18:
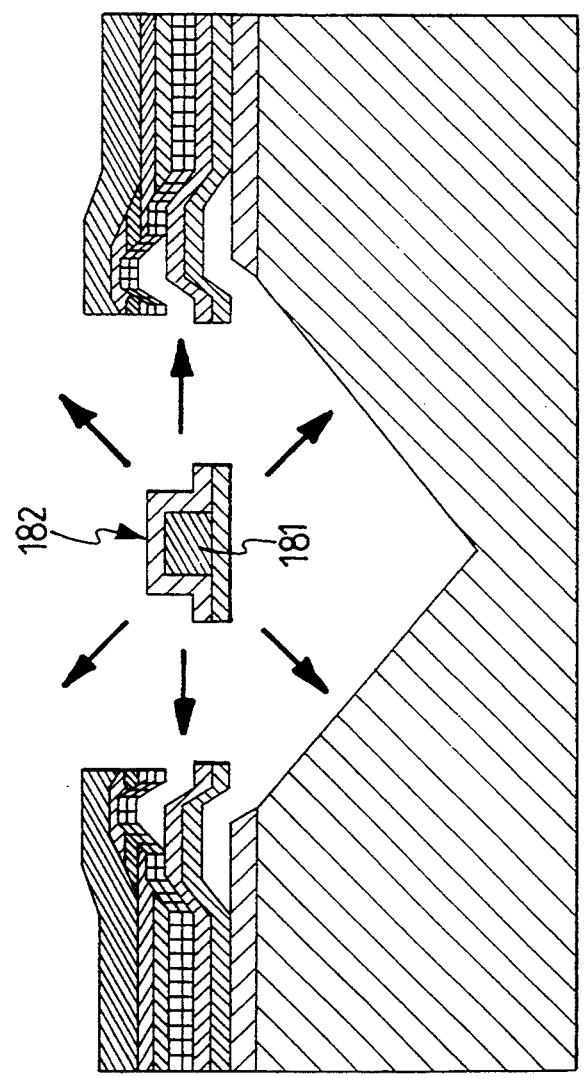
FIG. 18 shows a cross sectional view of a conventional micro-Pirani thermal conductive vacuum meter, wherein the filament is replaced by a floating beam of polysilicon.
Figure 19:
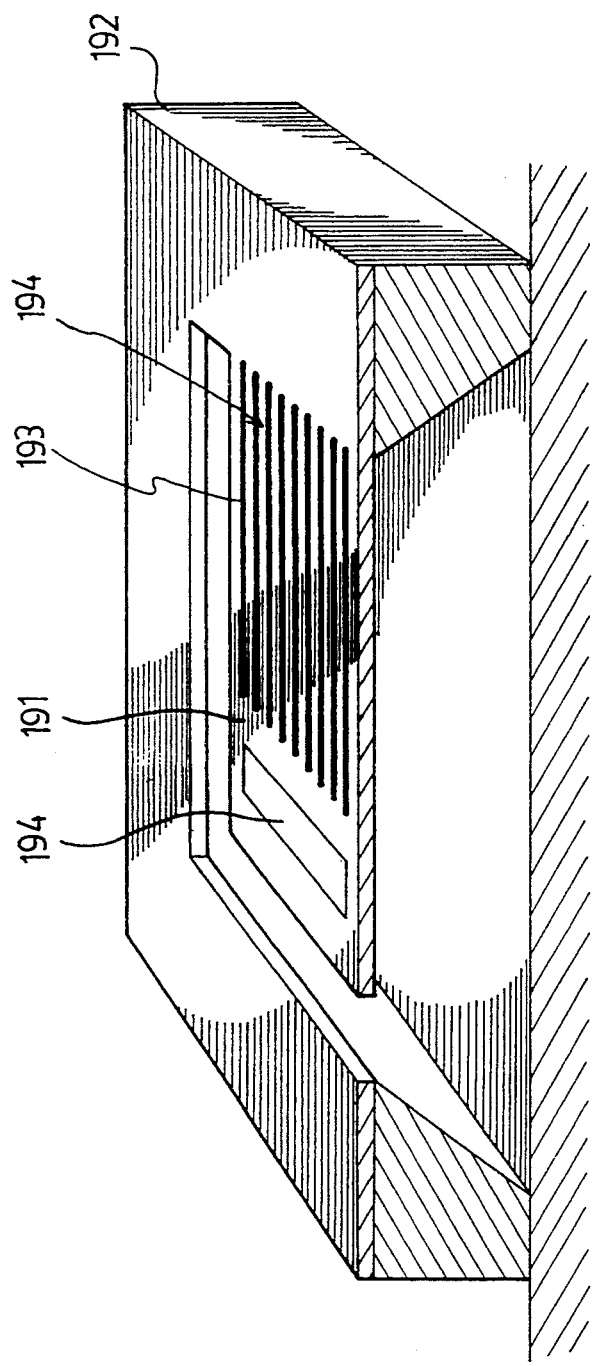
FIG. 19 shows a conventional thermopile vacuum meter with a single-side floating cantilevel.

In accordance with the present invention, it uses a dummy resistor to replace the conventional dummy tube as the tube S' in FIG. 17. The dummy resistor is manufactured in the process of the deposition of the Pt thin film as described in the embodiments of FIGS. 6-8 (i.e., the elements 62d in FIG. 6, 74d in FIG. 7 and 84d in FIG. 8). Since the material of the dummy resistor is the same as that of the sensing element 15 on the floating plate 12 and can be manufactured in one single process step, the temperature coefficients of both of the elements are nearly identical. Further, the silicon substrate 14 can be installed on a metal package (which will be described hereinafter) in order to make the temperature of the substrate 14 approximate to the ambient temperature and thus, when the ambient temperature drift effect occurs, the temperatures and resistance of both of the dummy resistor and the sensing element will change simultaneously so as to obtain the effect of temperature compensations.

Although the above compensation has largely improved the disadvantages of the conventional vacuum meter due to the proximity of the two resistor elements, the manner still has some disadvantages. In general, the temperature and the impedance coefficient of the metal thin film resistor has the following relationship equation:

$$\rho = \rho_0[1 + \alpha_0(T - Ta)]$$

wherein $\alpha_0$ is a temperature coefficient of the resistor, Ta is the ambient temperature, T is the temperature of the sensing element (i.e., the temperature of the floating plate) and $\rho$ is the resistivity of the sensing element.

Figure 9:
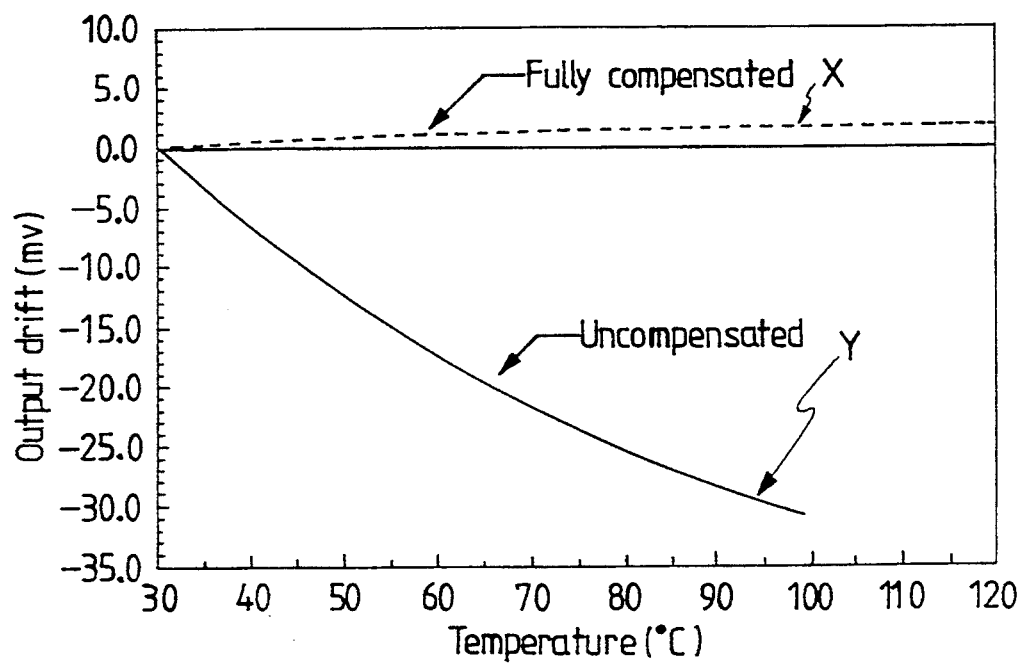
FIG. 9 shows a temperature drift curve diagram of the output signals by a full compensated method (as the curve (X)) and an uncompensated method (as the curve (Y))

As the temperatures of the dummy resistor and the sensing element on the floating plate are not identical in operation (i.e., one is the ambient temperature and the other is the temperature of the floating plate), the temperature coefficients $(d\rho/dT)/\rho$ thereof should not be the same. When the ambient temperature changes, the ratio of change of both of the elements are variable so that the output of the bridge circuit will be drifted. The condition, however, is different from the conventional case. As shown in FIG. 9, when the layouts and manufacturing process of the dummy resistor and the sensing resistor (element) are consistent (which is called a fully compensation), the temperature drift curve is shown as Curve X in FIG. 9. When the dummy resistor is replaced by a constant resistor with a zero-temperature coefficient (which is called an un-compensation), the temperature drift curve is shown as Curve Y in FIG. 9. It can be seen from the figure that the full-compensation has improvements over the un-compensation. While, since the temperature of the two resistors are different, the temperature drift effect still can not be overcome completely as interpreted above.

Figure 10:
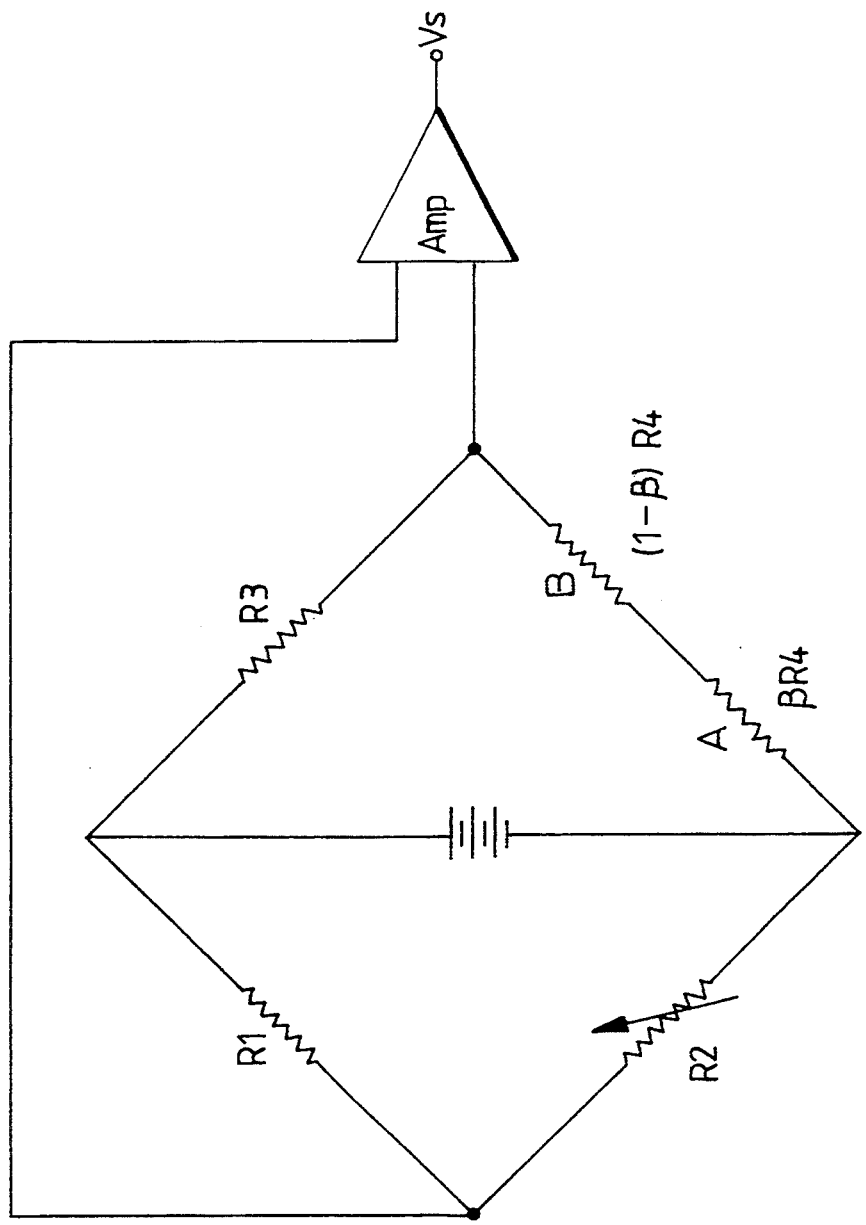
FIG. 10 shows a specific temperature-compensation circuit in accordance with the present invention, wherein $\beta R_4$ represents a constant impedance, $(1-\beta)R_4$ represents a resistor with the same material as the sensing resistor $R_3$, the coefficient $\beta$ is a value between 0.1 and 0.5.

It is interestingly found that the full compensation is positive-drifted while the un-compensation is negative-drifted. Therefore, to solve completely the problem of ambient temperature drift effect, the present invention combines the full-compensation resistor and the uncompensation-constant resistor by a specific ratio for a partial compensation and put them on the position S' of the circuitry of FIG. 17. The connection manner is as shown in FIG. 10 in which the mixed dummy resistor is combined by $\beta R4$ (A) and $(1-\beta)R4$ (B), wherein the $\beta$ is the ratio of the constant resistance and the total dummy resistance which is between 0.1–0.5, $\beta R4$ is a constant resistor of zero TCR and $(1-\beta)R4$ represents a resistor made of the same material as the R3.

Figure 11:
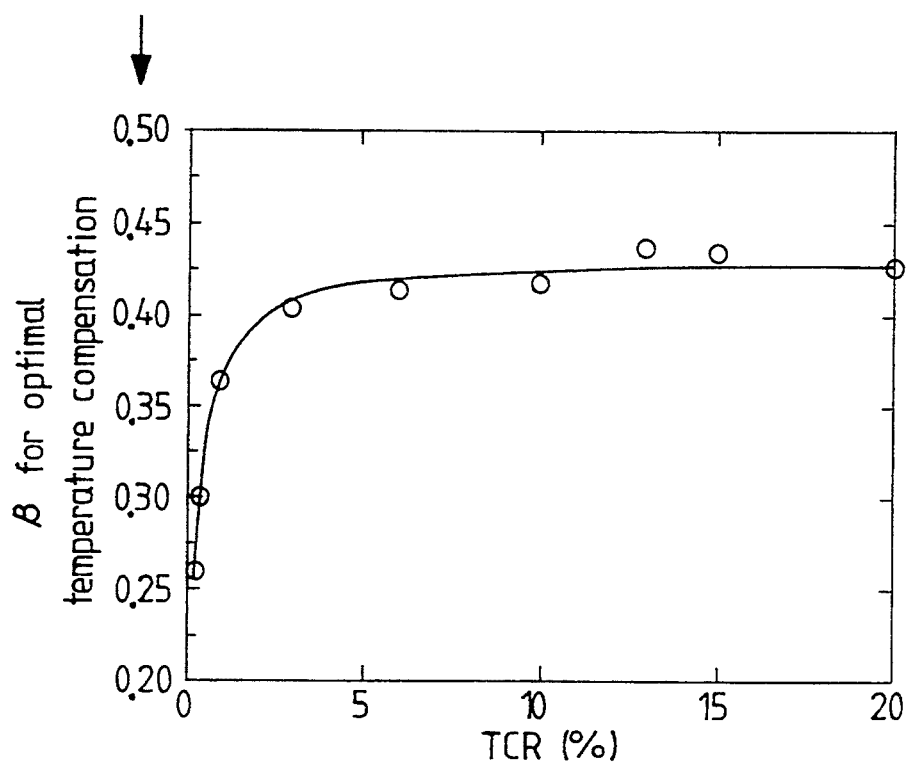
FIG. 11 is a diagram showing the optimized value of $\beta$ for optimal temperature compensation in materials with different TCR (temperature coefficient of resistance)
Figure 12:
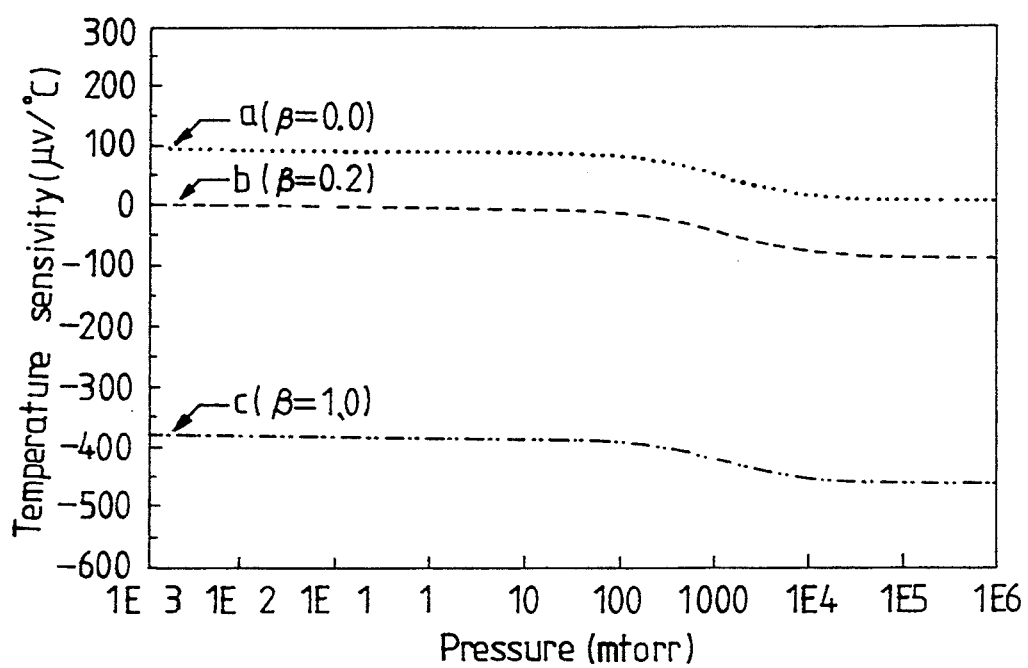
FIG. 12 is a curve diagram showing the relationship of the temperature sensitivity and the pressure after temperature compensation in accordance with the present invention, wherein T−Ta=100° C., α=0.25%, A=10 μm, B=16 μm and C=128 μm.

The factor $\beta$ and the temperature coefficient $A^0$ of the sensing resistor has a relationship as the following equation:

$$\beta = \frac{(T - Ta)}{1 + (T - T_0)}$$

wherein $T_0$ is the reference temperature. Assume that the resistance coefficient of a Pt floating plate is 0.25% in room temperature, the difference of temperature of the floating plate $T - T_0$ is 100° C., then the $\beta$ is about 0.2. In practice, the Pt thin film resistor can be made by other temperature-sensitive materials without departing from the spirit of the present invention. Therefore, the floating temperature T and the temperature coefficient $\alpha_0$ will vary with the material and the bias voltage of the sensing resistor, which results in the change of the factor $\beta$. FIG. 11 shows a curve of the factor $\beta$ for optimal temperature compensation. The optimal value of $\beta$ for different TCR values is between 0.1 and 0.5 which is evidenced from the curve shown in FIG. 12. FIG. 12 shows curves of the temperature sensitivity at different pressure when $T - T_0 = 100°$ C. and $\alpha_0 = 0.25\%$. It is found that when $\beta = 0.2$, the temperature drift effect can be completely eliminated below the useful vacuum pressure of 300 torr, which proves the advantages of the present invention over the prior art.

Figure 13:
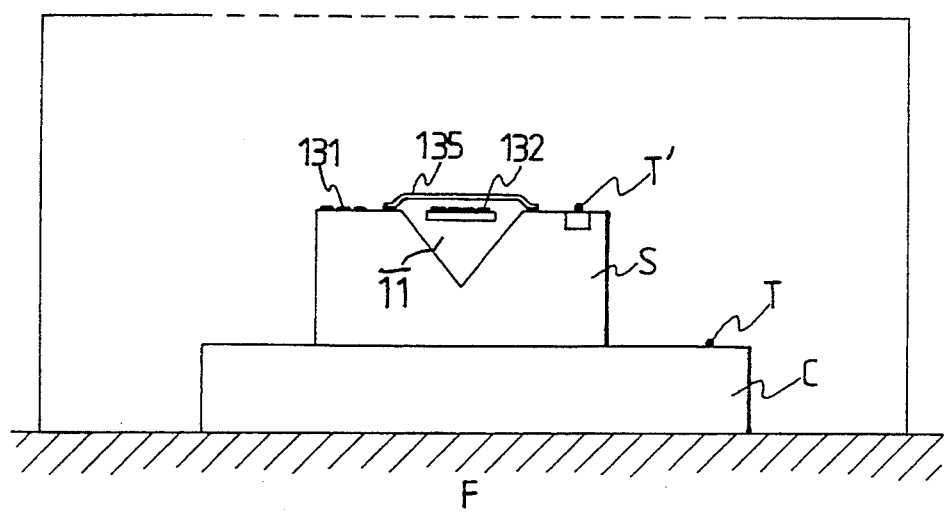
FIG. 13 shows a packing construction comprising the sensing device, a thermoelectric cooler and a packing cover for maintaining the temperature of the sensing device and preventing from the ambient temperature drift effect.

To further eliminate the residual temperature drift effect, the present invention still discloses a temperature controlled device as shown in FIG. 13 to maintain the vacuum sensing device in a state having a reference temperature. As shown in the figure, the sensing device S is adhered to a solid-state thermoelectric cooler C and the elements with reference numbers 131 and 132 represent the dummy resistor (the element B in FIG. 10) and the Pirani sensing elements, respectively. A first temperature sensing element T' is installed on the vacuum sensing device S. The temperature sensing element T' can be, as the dummy resistor, manufactured in the same process of the thermal sensitive resistor. The solid-state thermoelectric cooler C is also adhered to a base F of a package device on which another temperature sensing element T is installed. Both the temperature sensing elements can be connected with individual external temperature controlling circuits (not shown). Element T is used to control the cooling power of the thermoelectric cooler C (main temperature control), while element T' is used to control the minor heating power itself (fine temperature control). Therefore, the temperature of the vacuum sensing device can be controlled more effectively.

Figure 14A:
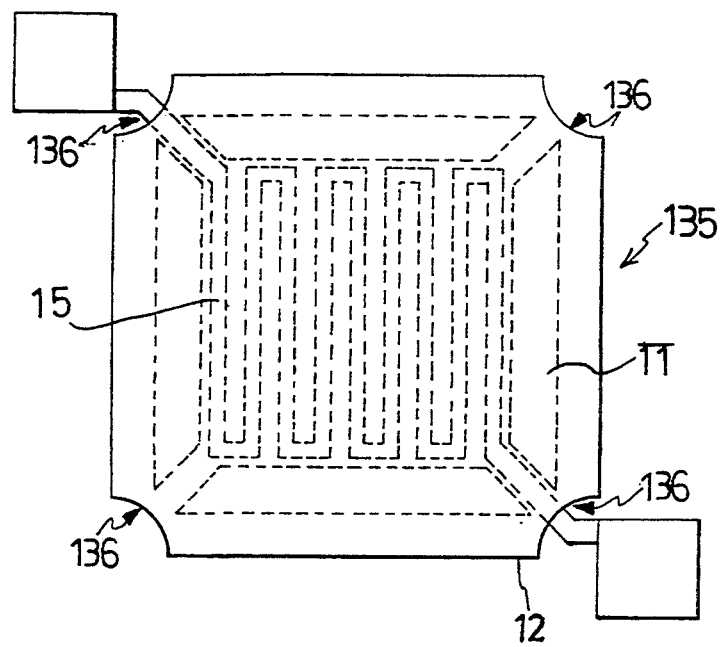
FIGS. 14(a) and 14(b) respectively shows a top view and a sectional view of a sensing device above which a thermal shield is covered for maintaining the circumferential temperature above the sensing device and preventing from interference of heat radiation.
Figure 14B:
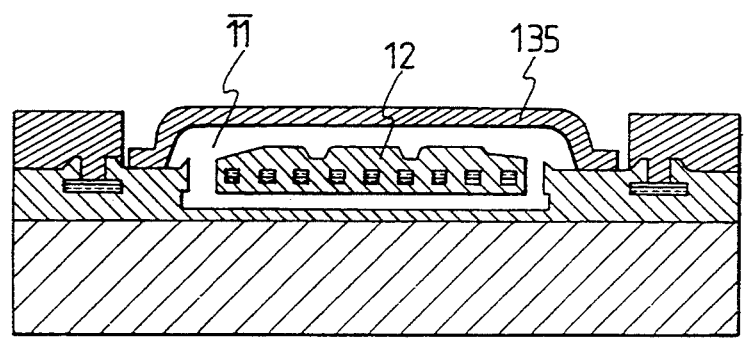

In addition, to prevent the floating plate from interference of an external heat radiation in the operation of the vacuum system, the present invention further comprises a thermal shield 135 installed above the floating plate 12. The detailed construction of the thermal shield 135 is shown in FIG. 14(a) and 14(b). The thermal shield 135 is bridge-connected with the edges of the cavity 11 for covering the floating plate 12 and on the corresponding positions to the supporting arms of the floating plate 12, the thermal shield 135 is not adhered to the substrate and has openings 136, as shown in FIG. 14 (a) and (b). The manufacturing process of the shield 135 is according to the method of the sacrifice layer 72 in FIG. 7 mentioned above. Now take the example of the process of FIG. 6 to describe the manufacturing process of the thermal shield 135. The diagrams of the process are shown in FIGS. 15(a)–15(j).

Figure 15A:
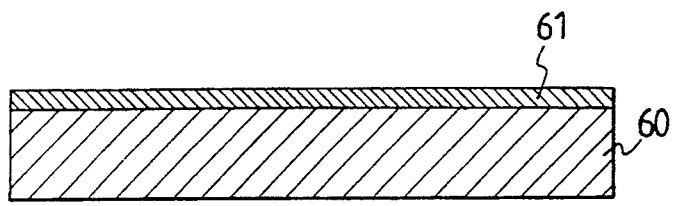
FIG. 15(a)–15(j) show a manufacturing process of the fourth embodiment of the present invention which comprises the steps of manufacturing a thermal shield.
Figure 15B:
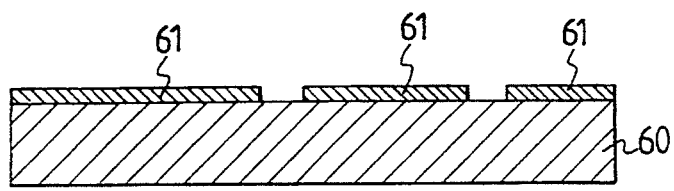
Figure 15C:
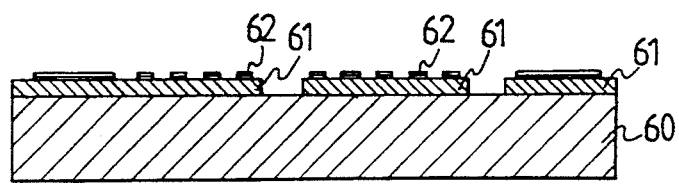
Figure 15D:
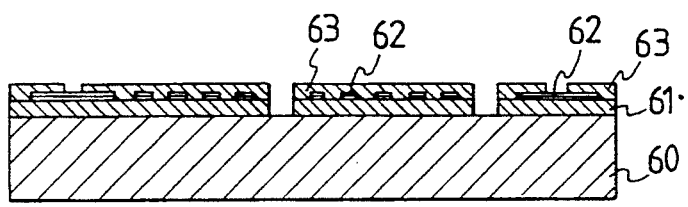
Figure 15E:
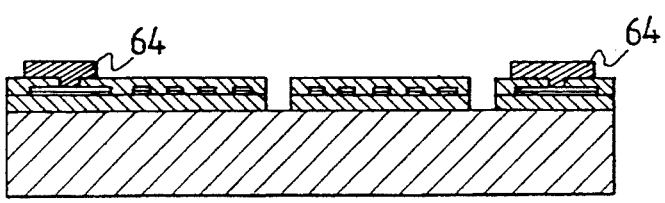
Figure 15F:
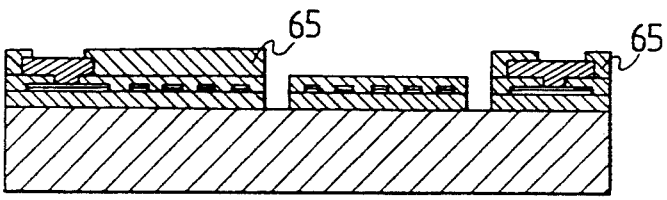
Figure 15G:
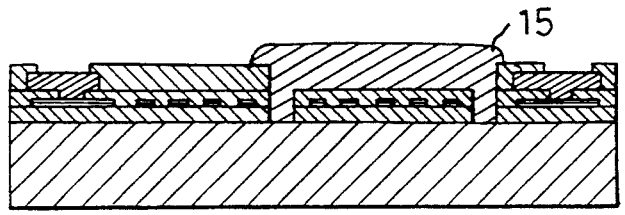
Figure 15H:
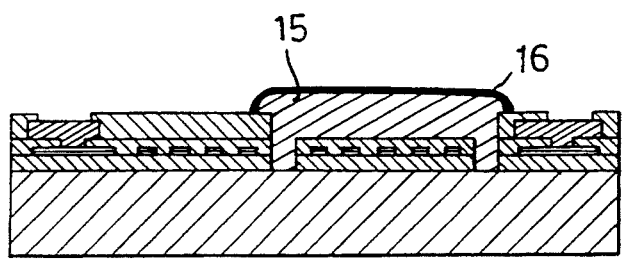
Figure 15I:
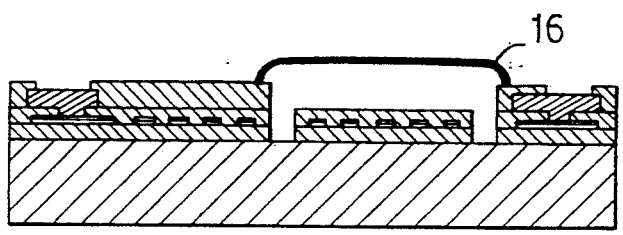
Figure 15J:
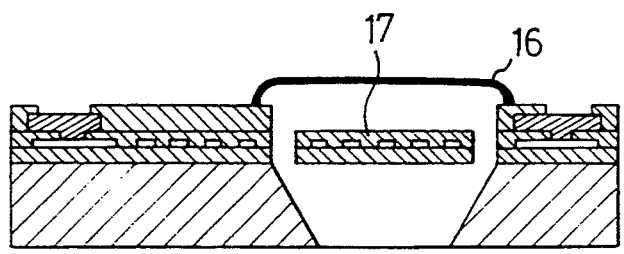
Figure 16A:
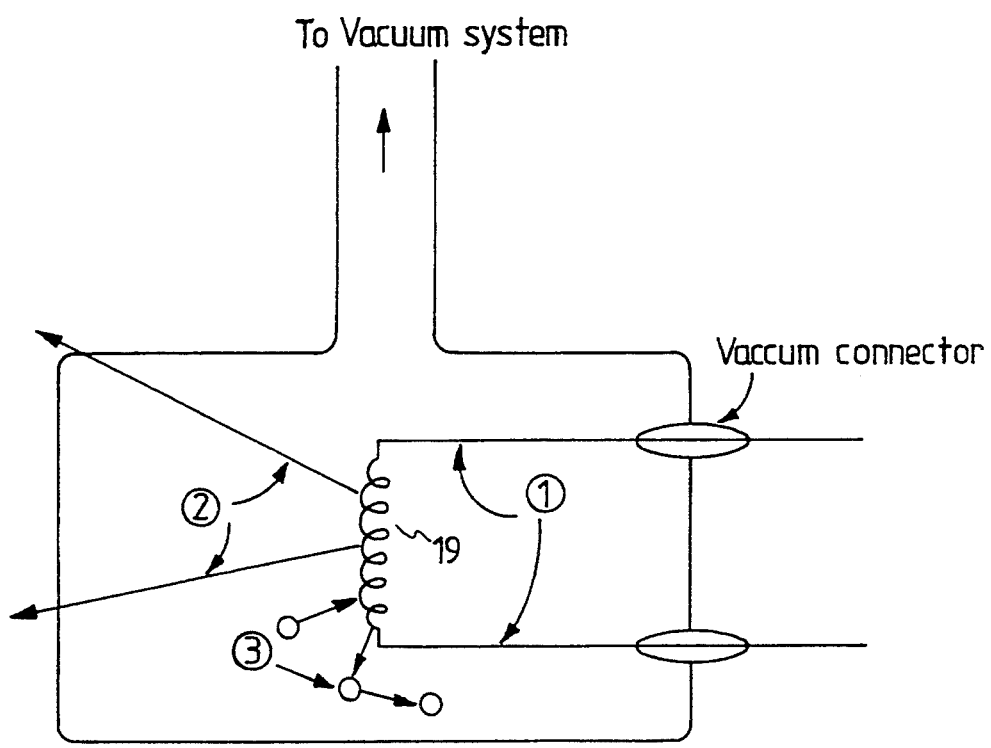
FIG. 16(a) is a diagram showing three heat dissipation manners of a heated filament in a thermal conductive vacuum meter.
Figure 16B:
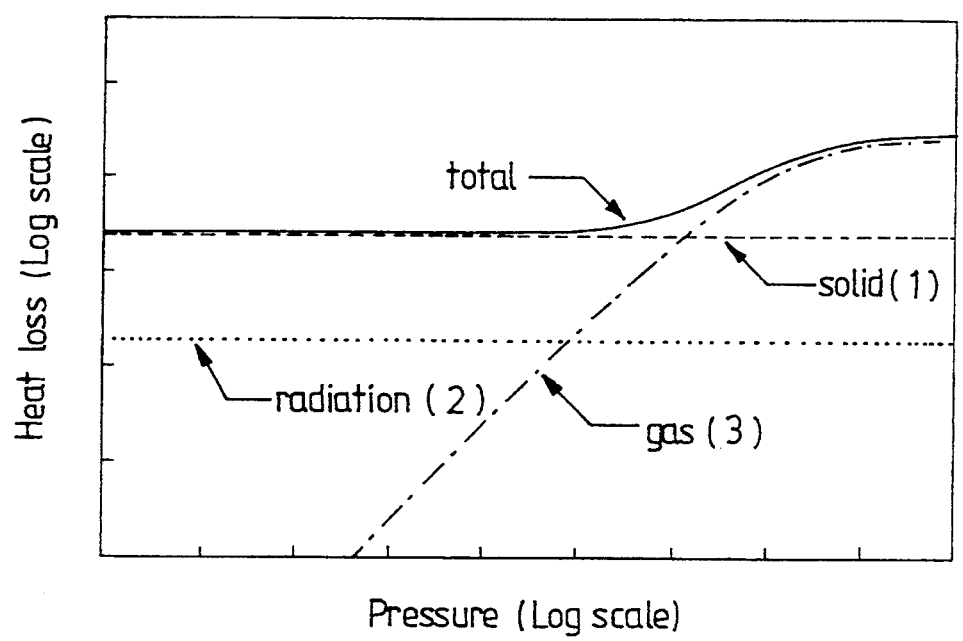
FIG. 16(b) is a diagram showing the relationship of the vacuum pressure and the three heat dissipation manners of a heated filament shown in FIG. 16(a)

According to the present invention, the thermal shield 135 is manufactured as the method of the sacrifice layer 72 mentioned in the example of FIG. 7. Therefore, if take the example of FIG. 6, it should add the steps of FIGS. 7(g) and 7(h) between the steps of FIGS. 6(f) and 6(g) to manufacture the thermal shield. As shown in FIGS. 15(a) and 15(b), after the process of FIG. 15(f) (i.e., FIG. 6(f)), grow a polyimide sacrifice layer 15 on the region desired to form the floating plate by means of a photolithographic technique (see FIG. 15(g)) and then deposit a metal layer 16 to define the region of the thermal shield 135. In process of FIG. 15(i), by means of a differential etching method, the polyimide layer 15 below the metal layer 16 are etched away so that the metal layer 16 (i.e., the thermal shield 135) is suspended above the region desired to be formed to the floating plate. Finally, the floating plate 17 is formed by etching the silicon below the floating plate 17 according to the anisotropic etching technique. The final construction composed of the floating plate and the thermal shield is as shown in FIG. 15(j). The same method can be also applied in the examples of FIGS. 7 and 8 without departing from the spirit of the present invention.

Obviously, according to the present invention, the temperature of the thermal shield will be almost the same as that of the substrate since the high thermal conductive shield is adhered to the substrate. Therefore, the portion below and beyond the floating plate 17 will be maintained on a constant temperature by the control of the thermoelectric cooler so that the disadvantages including the heat interference will be improved completely.

In view of the above, by means of the temperature controlled device, the temperatures of the floating plate and the ambient temperature of the vacuum sensing device of the present invention will be maintained constant and the ambient temperature drift effect will be disabled by the corporation with the mixed-resistor temperature compensation circuit. Therefore, the thermal conductive micro-Pirani vacuum meter disclosed in the present invention will have a good sensitivity of the vacuum pressure and a perfect limitation of sensing pressure.

We claim:

1. A micro-Pirani vacuum meter, a structure thereof comprising:
   (a) a floating plate suspended on a cavity of a silicon substrate made by a anisotropic etching technique;
   (b) a plurality of suspending arms extending from said floating plate to connect to said substrate on the circumference of said cavity for supporting said floating plate suspended on said cavity; and
   (c) a mixed resistor circuit for temperature compensations; said mixed resistor circuit being composed of a thermal sensitive constant resistor A with a zero temperature coefficient and a resistor B made of the same material as the thermal sensitive constant resistor A; both of said resistors being serially connected to each other on said floating plate.

2. The vacuum meter of claim 1, wherein the ratio of the impedance of said thermal sensitive constant resistor A and the total impedance of said mixed resistor circuit is $\beta$ and $\beta$ is a value between 0.1 and 0.5.

3. The vacuum meter of claim 1, further comprising a thermal shield which is convex and arched shaped and covers said floating plate with a gap therebetween; said thermal shield being adhered to the circumferential substrate of said cavity on the edges thereof with a number of openings on corresponding positions to said suspending arms of said floating plate.

4. The vacuum meter of claim 3, further being stacked on a thermoelectric cooler having a constant temperature controlling means and then being packaged on a base for providing further temperature compensation and stabilization effects.

5. The vacuum meter of claim 1, further being stacked on a thermoelectric cooler having a constant temperature controlling means and then being packaged on a base for providing further temperature compensation and stabilization effects.

6. The vacuum meter of claim 1, wherein the material of said floating plate is $SiO_2$ or $Si_3N_4$ or SiON.

7. The vacuum meter of claim 1, wherein the material of said thermal sensitive constant resistor A is a material with high thermal sensitivity.

* * * * *